(12) United States Patent
Lee et al.

(10) Patent No.: US 9,306,366 B2
(45) Date of Patent: Apr. 5, 2016

(54) OPTICAL AMPLIFIER ARRANGEMENT

(71) Applicant: Rofin-Sinar UK Ltd., Kingston Upon Hull (GB)

(72) Inventors: Jason Robert Lee, Kingston Upon Hull (GB); Benjamin Stuart Fulford, Kingston Upon Hull (GB)

(73) Assignee: ROFIN-SINAR UK LTD., Kingston Upon Hull (GB)

( * ) Notice: Subject to any disclaimer, the term of this patent is extended or adjusted under 35 U.S.C. 154(b) by 15 days.

(21) Appl. No.: 14/445,506

(22) Filed: Jul. 29, 2014

(65) Prior Publication Data

US 2015/0043057 A1 Feb. 12, 2015

(30) Foreign Application Priority Data

Aug. 7, 2013 (GB) .................................. 1314098.3

(51) Int. Cl.
*H01S 3/00* (2006.01)
*H01S 3/10* (2006.01)
(Continued)

(52) U.S. Cl.
CPC ........... *H01S 3/10023* (2013.01); *H01S 3/0602* (2013.01); *H01S 3/163* (2013.01); *H01S 3/2325* (2013.01); *H01S 3/0606* (2013.01);
(Continued)

(58) Field of Classification Search
CPC ............ H01S 3/32333; H01S 3/08095; H01S 3/0606; H01S 3/0602; H01S 3/10023; H01S 3/163
USPC .......................................................... 359/347
See application file for complete search history.

(56) References Cited

U.S. PATENT DOCUMENTS 5,014,282 A 5/1991 Herziger et al.
6,256,332 B1 7/2001 Anikitchev
6,654,163 B1 11/2003 Du et al.
(Continued)

FOREIGN PATENT DOCUMENTS

EP 0821453 A2 1/1998
EP 2475054 A1 7/2012
(Continued)

OTHER PUBLICATIONS

Kiriyama H et al: "Demonstration of high energy-extraction efficiency in a novel laser-diode pumped eight-pass Nd:YAG zig-zag slab amplifier", Fusion Engineering and Design, Elsevier Science Pub., Amsterdam, NL, vol. 44, No. 1-4, Feb. 1, 1999, pp. 419-422; p. 419, RH col., para. 2 to p. 420, RH col., para. 1; fig. 1.
(Continued)

*Primary Examiner* — Mark Hellner
(74) *Attorney, Agent, or Firm* — Law Office of Jesse D. Lambert, LLC

(57) ABSTRACT

An optical amplifier which integrates a pre-amplifier and a power amplifier in a single rectangular active medium to enable amplification of low power ultra-short pulses to optimal power levels. A seed beam passes through the amplification medium along a first pre-amplification path making multiple traverses of the medium. It is imaged back along the first path to make a double pass of the medium as a pre-amplifier. The beam is then re-imaged into the medium again on a second power amplification path, making multiple traverses of the medium in a single pass. The paths are independent but overlap so that efficient power extraction is achieved. Embodiments based on all passive components are described.

21 Claims, 3 Drawing Sheets

(51) Int. Cl.
  H01S 3/23 (2006.01)
  H01S 3/16 (2006.01)
  H01S 3/08 (2006.01)
  H01S 3/081 (2006.01)
  H01S 3/0941 (2006.01)
  H01S 3/223 (2006.01)
  H01S 3/06 (2006.01)

(52) U.S. Cl.
  CPC .............. *H01S 3/0612* (2013.01); *H01S 3/081* (2013.01); *H01S 3/08072* (2013.01); *H01S 3/08095* (2013.01); *H01S 3/0941* (2013.01); *H01S 3/10061* (2013.01); *H01S 3/2232* (2013.01); *H01S 3/2333* (2013.01)

(56) References Cited

U.S. PATENT DOCUMENTS

| | | | |
|---|---|---|---|
| 7,720,126 B2 * | 5/2010 | McCarthy | H01S 3/2316 372/100 |
| 7,903,715 B2 | 3/2011 | Nowak | |
| 8,798,105 B2 * | 8/2014 | McCarthy | H01S 3/08059 372/10 |
| 2005/0205811 A1 | 9/2005 | Partlo et al. | |
| 2006/0103918 A1 * | 5/2006 | Damzen | H01S 3/0606 359/333 |
| 2009/0316746 A1 | 12/2009 | Nowak et al. | |

FOREIGN PATENT DOCUMENTS

| | | |
|---|---|---|
| JP | 2009 026854 A | 2/2009 |
| WO | WO 88/09578 A | 12/1988 |

OTHER PUBLICATIONS

Kiriyama H et al: "Development of high-repetition-rate LD pumped Nd:YAG laser and its application", Laser Physics, NAUKA/Interperiodica, MO, vol. 16, No. 4, Apr. 1, 2006, pp. 666-672; p. 666, RH col., para. 3, to p. 667, RH col., last line; Fig. 1.

\* cited by examiner

OPTICAL AMPLIFIER ARRANGEMENT

CROSS REFERENCE TO RELATED APPLICATIONS

This United States application claims priority to GB1314098.3, filed 7 Aug. 2013.

STATEMENT REGARDING FEDERALLY SPONSORED RESEARCH OR DEVELOPMENT

Not applicable.

BACKGROUND OF THE INVENTION

The present invention relates to an optical amplifier apparatus for use in amplifying low power, reduced frequency, ultrashort pulse seeds and in particular, though not exclusively, to an optical amplifier apparatus having an integrated pre-amplifier and power amplifier in a single crystalline slab active region.

Lasers with pulse widths of less than 10 ps offer new processing capabilities in micro-machining industrial applications. However, the processing speeds enabling mass manufacture require pulse repetition frequencies of between 100 kHz to 10 MHz, adjustable to an optimal frequency with average powers in excess of 100 W. Typically, such combinations are not achievable with most laser architectures as the maximum pulse energy is limited by non-linear effects and damage to the laser crystal. Thin disk laser oscillators have achieved powers approaching 150 W, being at the lower end of the power range required, but at fixed pulse repetition frequencies of between 3.50 MHz and 60 MHz, being above the required range, and they cannot easily be adjusted to an optimal frequency for a specific process whilst maintaining the average power.

Currently, master oscillator power amplifiers (MOPA's) are used to obtain the high average powers required. In such apparatus a low power laser master oscillator generates pulses of the required width which are coupled into a power amplifier. The input pulse stimulates emission within the amplifier which is added to the input pulse to create a higher output energy pulse. As both the intensity and fluence are significantly lower than would be achieved within an oscillator having a similar output, the apparatus can achieve higher output power and energies before damage occurs. MOPA's are now being implemented in a number of alternative laser architectures.

U.S. Pat. No. 6,654,163 to Fraunhofer-Gesellschaft zur Foerderung der angewanten describes an optical amplifier apparatus which is found in the commercially available INNOSLAB amplifier from, for example, EdgeWave GmbH, Germany. As illustrated in FIG. 1, this apparatus has a rectangular crystalline slab amplifier medium A. Beam B, which is emitted by an oscillator, travels a path C between mirrors D,E in which the beam B traverses the amplifier medium A multiple times. With each traverse of the medium A, the cross section of the beam B increases in the x-direction. The beam size is maintained in the thin y-direction. The expansion along the x-axis is chosen to ensure the beam intensity is held nearly constant as the beam is amplified. The number of traverses is chosen to maximise overlap between the beam B and amplifier medium A. In this way, using a single pass through the amplifier, stored energy can be efficiently extracted whilst the thresholds for damage and non-linear effects are avoided. Using such apparatus, average power levels of 400 W with a pulse width of 680 fs at a frequency of 76 MHz have been achieved.

A disadvantage of this arrangement is that sufficient input power is required to ensure effective saturation occurs in the initial few passes through the amplifier.

Amplifier systems which then cascade such oscillator-amplifier apparatus with a second, rectangular slab amplifier, where the beam makes a path of one traverse in a single pass, can achieve power levels of up to 1.1 kW with a pulse width of 615 fs at a frequency of 20 MHz. Again, these amplification approaches rely upon sufficient input seed power to ensure effective extraction. In addition, a cascaded arrangement requires considerable space.

To overcome the disadvantage of requiring sufficient input seed power, amplification of lower seed powers using regenerative amplifiers or pre-amplification stages have been proposed. U.S. Pat. No. 7,903,715 to Gigaphoton Inc. details use of a regenerative amplifier in an alternative laser architecture. An embodiment is shown in FIG. 2 where one amplification medium slab F is used to perform the multiple functions of an amplifier G arranged in the manner of FIG. 1, with a single pass of multiple traverses of the active medium F, and a regenerative amplifier H, with multiple passes of a single traverse of the active medium F. A low power seed laser J is injected into a resonator formed of two mirrors M, N. The injected signal is introduced by switching a photoacoustic element K. The beam B then makes multiple passes in a single traverse between the mirrors M, N until the majority of the stored energy is extracted. In a desired timing, a Pockels cell L is switched and the beam B is output from the regenerative amplifier H into the amplifier G using a polariser P. The arrangement is compact in that the amplifier G and the regenerative amplifier H share the same active medium F, but they are separated from each other in the medium F and operate as largely independent devices.

A disadvantage of this arrangement is in the requirement for active components. Such Pockels cells and photoacoustic elements add cost and complexity to the arrangement.

It is an object of the present invention to provide an optical amplifier which provides amplification for low power, reduced frequency, ultra-short seed pulses.

It is a further object of at least one embodiment of the present invention to provide an optical amplifier which integrates a pre-amplifier and a power amplifier in an active medium with partial coupling of the pre-amplifier and the power amplifier.

It is a still further object of at least one embodiment of the present invention to provide an optical amplifier which uses purely passive components.

BRIEF SUMMARY OF THE INVENTION

According to a first aspect of the invention there is provided an optical amplifier apparatus comprising: an amplification medium that has an approximately rectangular cross-section with a long edge and a short edge; at least two highly reflective mirrors, wherein the amplification medium is arranged between the at least two highly reflective mirrors; wherein the short edge of the cross-section is along the x-axis, the long edge is along the y-axis, and the z-axis is the optical axis, and wherein the x-, y- and z-axes constitute a rectangular system of coordinates; wherein the mirrors are designed and arranged in such a way that a beam that is to be amplified, makes at least one reflection from each of the mirrors to define a path comprising a plurality of traverses through the amplification medium in the xz plane; and wherein the beam, emitted from an oscillator, makes a double pass of a first path in a pre-amplifier stage and a single pass of a second path in a power amplifier stage, and wherein the first and second paths are independent and overlap in the amplification medium.

By providing an arrangement where the beam passes through the amplification medium along a first pre-amplification path, returns along the same first path and then passes through the amplification medium again along a second power amplification path which locally overlaps the pre-amplification path so that some partial coupling occurs, the system can ensure effective saturation of all the traverses through the amplifier. In addition, by passing the beam over the first pre-amplification path twice, efficient power extraction is achieved. As the second path differs from the first path, maximised overlap of the paths with the amplification medium can be achieved thus enabling amplification of low power ultra-short pulses to optimal power levels.

Preferably, the beam makes at least three traverses of the amplification medium on each path. This allows the amplification medium to be compact and thus provides a small device. Preferably, the second path makes at least one more traverse than the first path. Optionally, the second path makes at least twice as many traverses as the first path. In this way, the overlap with the amplification medium is maximised.

Preferably, the optical amplifier includes an imaging mirror located at an exit side of the amplification medium wherein the beam is incident upon the imaging mirror after a first pass of the first path and the imaging mirror is arranged to re-image the beam back along the first path to make the double pass in the pre-amplifier stage. In this way, the returned beam is an image of the beam at the input to the amplifier with the returned beam exactly overlapping the first path of the beam through the amplifier ensuring a double pass of the same path. Provided the gain along the path is sufficiently high, the second path ensures saturation and efficient extraction.

Preferably, the optical amplifier includes first and second lenses located at an input side of the amplification medium wherein the lenses are arranged to form a telescope with a magnification of one. In this way, the beam, on exiting the pre-amplifier stage, can be re-imaged to form the input beam to the power amplifier stage.

Preferably, the optical amplifier includes a plurality of polarising elements. Preferably a first polarising element is located adjacent to the imaging mirror on the exit side of the amplification medium. More preferably, the first polarising element is a quarter waveplate. In this way, a linearly polarised beam exiting the amplification medium can be converted to be circularly polarised, reflect from the imaging mirror and on passing through the quarter wave plate again, the circular polarisation is converted to linear polarisation in a direction perpendicular to the polarisation of the beam on the first pass of the first path.

Preferably, a second polarising element is located at an input side of the amplification medium. More preferably, the second polarising element is a polarising cube. Preferably the polarising cube is arranged so that the input beam emitted by the oscillator passes through the cube. In this way, the input beam can have its linear polarisation set at a desired orientation, while the returned beam from the pre-amplifier stage will be reflected at the cube. This reflection of the returned beam allows the beam to be directed into the amplification medium on a different path to the first path for the power amplifier stage.

Advantageously, the second polarising element and the first lens are arranged to couple the input beam emitted by the oscillator into the amplification medium for the pre-amplifier stage. More preferably, the polarisation cube is arranged between the first and second lenses. This provides a compact arrangement. Preferably also, a return mirror is located between the second polarising element and the second lens. The return mirror redirects the beam back into the amplification medium for the power amplifier stage. The use of a return mirror between the first and second lenses, effectively folds the telescope so that the arrangement is more compact.

In an embodiment, the optical amplifier includes a pulse picker arranged at an input to the optical amplifier. In this way, pulses can be rejected from the input beam of the oscillator to lower the frequency and thereby lower the average input power. Thus frequency optimisation can be achieved for a specific average power.

Preferably the highly reflective mirrors are planar. In this way, the beam can be arranged to walk across the mirrors in the y-direction upon each traverse in a path. Thus a zig-zag path is formed between the mirrors. Alternatively, the highly reflective mirrors may be selected from a group comprising: spherical mirrors, cylindrical mirrors and mirrors of differing radii of curvature along two perpendicular axes. Preferably the highly reflective mirrors are arranged to be non-parallel.

Preferably the amplification medium is a slab of rectangular shape and cross-section. Preferably, the amplification medium is a single optically excited crystalline slab. The slab may be formed in a crystalline sandwich structure with doped active medium arranged between two un-doped active mediums.

Alternatively, the amplification medium may be a gas excited between rectangular electrodes to provide a slab discharge having a rectangular cross-section with a long edge and a short edge.

BRIEF DESCRIPTION OF THE SEVERAL VIEWS OF THE DRAWINGS

Embodiments of the present invention will now be described, by way of example only, in which.

DETAILED DESCRIPTION OF THE PRESENTLY PREFERRED EMBODIMENTS OF THE INVENTION

Figure 3:
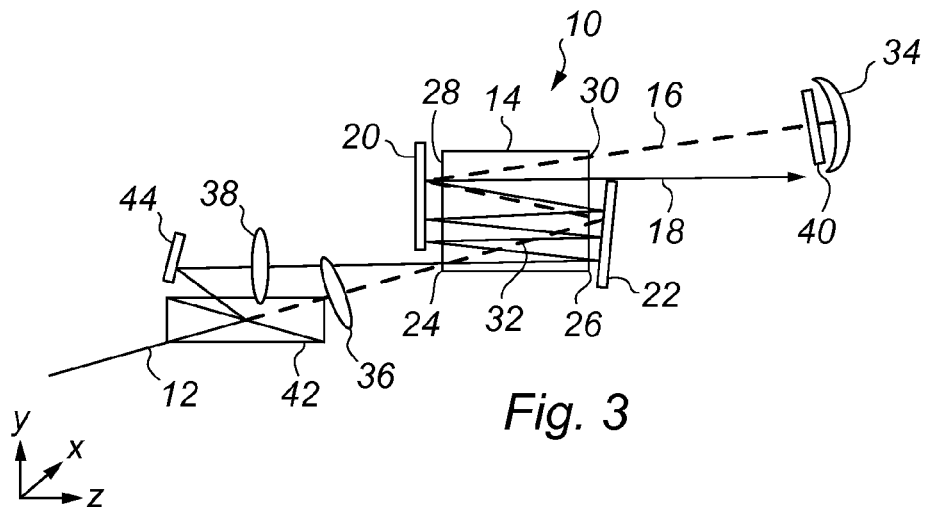
FIG. 3 is a schematic diagram of an optical amplifier according to an embodiment of the present invention.

Reference is initially made to FIG. 3 of the drawings which illustrates an optical amplifier, generally indicated by reference numeral 10, where a beam 12, emitted from a low power, CW or pulsed, oscillator (not shown) is amplified by passing through an amplification medium 14 in a first path 16, which makes a double pass through the amplification medium 14, and a second path 18, which makes a single pass through the amplification medium 14, according to an embodiment of the present invention. On each path, the beam 12 traverses the amplification medium 14 multiple times by reflection from mirrors 20, 22 arranged on an entry side 24 and an opposing exit side 26 of the amplification medium 14, respectively.

Figure 1:
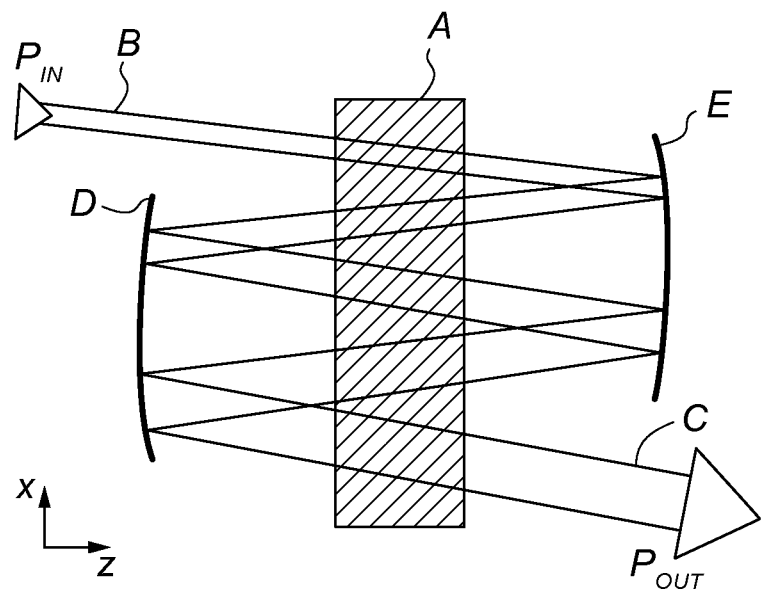
FIG. 1 is a schematic diagram of a prior art arrangement of an optical amplifier.
Figure 2:
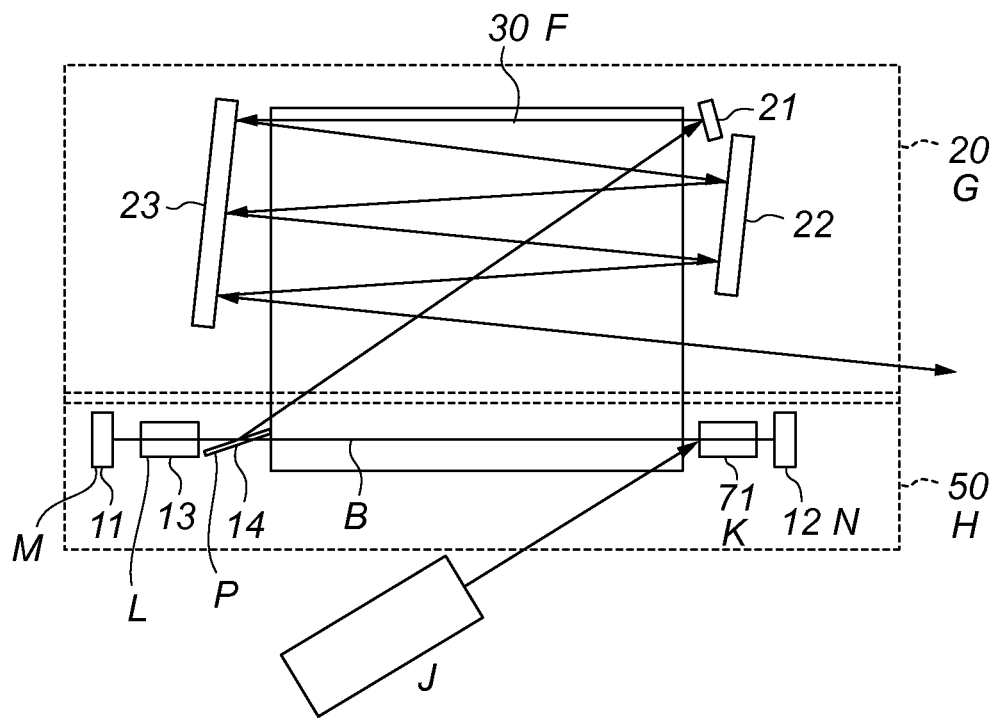
FIG. 2 is a schematic diagram of a prior art arrangement of another optical amplifier.

Amplification medium 14 is a single crystalline slab being rectangular in cross-section with a short edge and a long edge. The short edge of the cross-section is along the x-axis, the long edge is along the y-axis, and the z-axis is the optical axis when the x-, y- and z-axes constitute a rectangular system of coordinates. The long edge is shown in FIG. 1. In an embodiment, the amplification medium is a crystalline structure with a doped active medium sandwiched between two un-doped rectangular sections. As is known in the art, the amplification medium 14 is optically pumped giving an active gain region. This pumping may be by arrays of laser diodes. In an alternative embodiment, the amplification medium is created by a slab gas discharge. This is typically a gas, such as $CO_2$ being excited between two rectangular planar parallel arranged electrodes.

The mirrors 20, 22 are highly reflective so that the maximum amount of power is transferred through the optical amplifier 10. Mirrors 20, 22 are planar with a diameter sufficient to allow the beam 12 to 'walk' across the surface in the y-direction. The mirrors are arranged to face first 28 and second 30 ends of the amplification medium 14 and be staggered so that the beam can enter and exit each end 28, 30 without clipping an edge of either mirror 20, 22. While the mirrors 20, 22 can be arranged to be parallel to the ends 28, 30 a tilt angle can be introduced to reduce the likelihood of a laser oscillation between the mirrors which is not associated with the seed beam. This oscillation will reduce the stored energy available for the seed beam and reduce the obtainable output power. In alternative embodiments the mirrors 20, 22 are spherical, cylindrical or of differing radii of curvature along two perpendicular axes, typically the x and y. Preferably, the highly reflective mirrors are arranged to be non-parallel.

The arrangement of the mirrors 20, 22 is such that a beam 12 entering the amplification medium 14 at the entry side makes at least one reflection from each of the mirrors to define a path comprising a plurality of traverses 32 through the amplification medium 14 in the xy plane. Each traverse is in a different position so that the beam 12 is incident on each mirror 20, 22 at a different point for each reflection as it travels through the amplification medium 14. The path of traverses 32 appears as a zig-zag through the medium 14. It will be appreciated that the beam size and geometry of the amplifier 10 can be selected so that the path of the beam 12 overlaps a majority of the medium 14.

An imaging mirror 34 is located at the exit side 26 of the amplification medium 14 wherein the beam 12 is incident upon the imaging mirror 34 after a first pass of the first path 16. The imaging mirror is a spherical mirror with a radius of curvature selected to image the beam 12 exactly back on itself. In this way, the beam 12 is returned through the amplification medium 14 as a second pass. The returned beam is an image of the beam at the input 24 to the amplifier 10 with the returned beam exactly overlapping the first path 16 of the beam through the amplifier 10 ensuring a double pass of the same path 16.

Located adjacent the imaging mirror 34 is a quarter wave plate 40. Quarter wave plate 40 is a standard polarising element which converts linearly polarised light to circularly polarised light and vice-versa. A linearly polarised beam 12 exiting the amplification medium 14 is converted to be circularly polarised, reflects from the imaging mirror 34 and on passing through the quarter wave plate 40 again, is converted back to linear polarisation but in a direction perpendicular to the polarisation of the beam 12 when it exited the amplification medium 14.

At the entry side 24 of the amplification medium 14 the polarised beam 12, emitted from an oscillator or other laser seed, is input to the amplifier 10. Arranged at the entry side are first 36 and second 38 lenses together with a polarising cube 42 and a return mirror 44. The polarising cube 42 does not affect the polarisation of the input beam 12 as it passes therethough and the lens 36 arranged in the path 16 can be used to couple the beam 12 into the amplification medium 14. The polarising cube 42 is arranged such that the returned beam 12, having completed a double pass of the amplification medium 14, will be entirely reflected. The reflected beam is directed towards the return mirror 44 which is arranged to send the beam 12 back into the amplification medium 14 on a second path 18 different and independent to the first path 16. Between the return mirror 44 and the amplification medium 14 is arranged the second lens 38. The first 36 and second 38 lenses are arranged to form a telescope with a magnification of one. In this way, the beam, is re-imaged back into the amplification medium 14.

Figure 4:
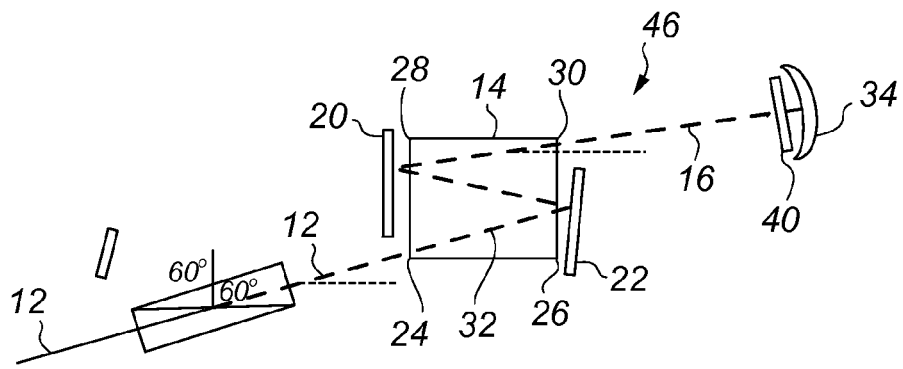
FIG. 4 is a schematic diagram of the pre-amplifier stage of the optical amplifier of FIG. 3.

In use, a linearly polarised seed input beam 12 is provided. This is provided by a source such as a low power, continuous wave or pulsed, oscillator (not shown) which may be conditioned using suitable optics (not shown) for optimal coupling into amplification medium 14. On entry to the amplifier 10, the beam 12 will travel through a pre-amplifier stage 46. This is best illustrated in FIG. 4, being those parts of FIG. 3 relevant to the pre-amplifier stage 46. Like parts have been given the same reference numeral to aid clarity.

The thin crystal slab of amplifier material 14 has been pumped with laser diodes to create a thin gain sheet. Within the crystal amplifier material 14 the beam 12 is confined by the thermally generated lens in the x-direction, also known as the thin axis, whilst the beam 12 is free to diverge in the y-direction, also known as the wide axis. The beam 12 continues to travel generally in the z-direction until it is incident upon the multi-bounce mirror 22. The tilt angle of mirror 22 directs the beam 12 along a second direction to traverse 32 through the crystal 14 until it is incident upon mirror 20. Mirror 20 then redirects the beam 12 through the crystal 14 along a further direction to again traverse the crystal 14 until it exits the amplification medium 14 by passing through end 30 of the crystal 14 above mirror 22. The beam 12 has travelled a first path 16 through the amplifier medium 14 in a single pass making three traverses 32 of the amplification medium 14.

The beam 12 then freely diverges along both axes before passing through the quarter wave plate 40 which converts the beams initial linear polarisation to circular polarisation. Beam 12 then strikes imaging mirror 34 before passing again through the quarter wave plate 40 which converts the circular polarisation of the beam to linear polarisation oriented along a perpendicular direction to the polarisation when the beam 12 was input to the amplifier 10. The imaging mirror 34 is chosen to ensure that the beam 12 is reflected as an image of the beam 12 at the input to the amplifier 10. In this way, the reflected beam 12 can exactly follow the first path 16 in reverse through the amplifier material 14 ensuring a double pass of the path 16. The gain along the first pass is sufficiently high so that the second pass ensures saturation and efficient extraction. The beam 12 then exits the amplifier material 14 through end 24 at the same location as it was input. The initial double pass along the path 16 of the amplifier system 10 constitutes a pre-amplifier stage 46.

Returning to FIG. 3, the beam 12 travels on from exiting amplifier material 14 and passes through first lens 36 before striking polarising cube 42. The polarisation rotation that occurred in the beam at quarter wave plate 40 results in the beam 12 being reflected internally in the polarising cube 42. The polarising cube 42 causes the beam 12 to be redirected to return mirror 44 which reflects the beam 12 in another direction causing it to pass through second lens 38. First lens 36 and second lens 38 form a telescope with a magnification of one which images the output from the pre-amplifier stage 46 back into the amplifier material 14 and the power amplifier stage 48.

Figure 5:
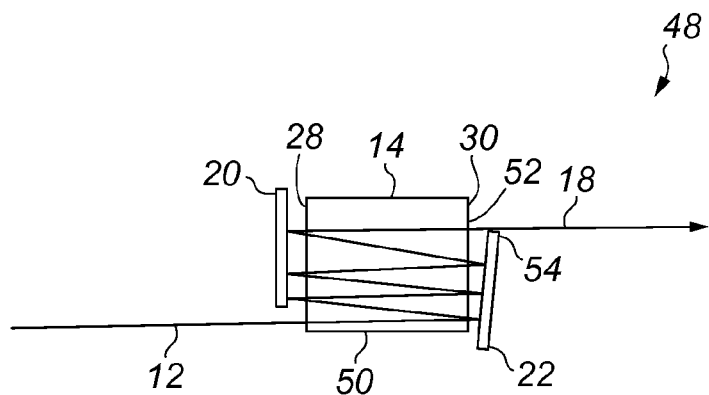
FIG. 5 is a schematic diagram of the power amplifier stage of the optical amplifier of FIG. 3.

In the power amplifier stage 48, illustrated in FIG. 5, being those parts of FIG. 3 relevant to this stage 48, beam 12 first propagates in amplifier material 14 along the z-direction, in this case parallel to side 50 of amplifier material 14. In the x-direction, the thin direction, the beam 12 is again contained by the thermally generated lens, whilst in the wide direction, y-direction, the beam 12 freely diverges. On exiting the amplification medium 14 after a first traverse 32 at end 30, the beam 12 strikes mirror 22 and is redirected through the amplifier material 14 before striking mirror 20 and further redirection. Multiple bounces, in this case six bounces, occur between mirror 20 and mirror 22 causing the beam 12 to make seven traverses through the amplifier material 14, following a second path 18. This single pass through the amplification medium 14 ends as the beam 12 is coupled out at the far edge 52 of the amplification medium 14, passing above edge 54 of mirror 22. Typically either seven, as is shown, or nine traverses of amplifier material 14 creates path 18 with the number of traverses 32 chosen to maximise the overlap of the beam 12 with amplifier material 14 without the beam 12 going on to clip the top edge 54 of mirror 54. The second path 18 through amplifier system 10 is termed the power amplifier stage 48 and is designed to ensure energy extraction from areas not included in the pre-amplifier stage 46 is maximised.

It is noted that the second path 18 traverses the same volume of the amplification medium 14 as the first path 16. The paths 16, 18 can be considered to overlap in the amplification medium 14 but are independent and distinct from each other by virtue of the differing angles of entry to the amplification medium 14. As shown in FIG. 3, optimal coupling of the beam 12 into the amplification medium 14 can be achieved with the beam entering the medium 14 at the same entry point in both the pre-amplifier 46 and power amplifier 48 stages.

Figure 6:
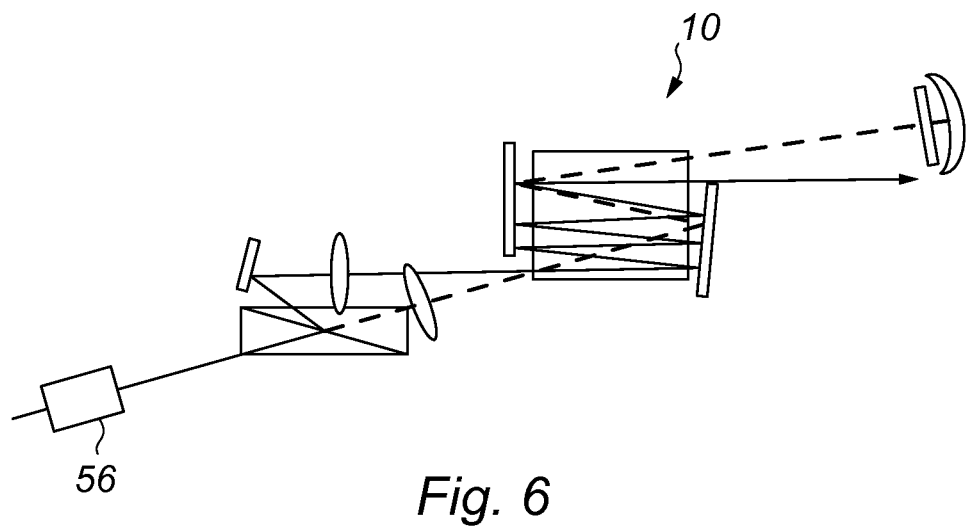
FIG. 6 is a schematic diagram of an optical amplifier according to a further embodiment of the present invention.

Referring now to FIG. 6 of the drawings there is illustrated the amplifier 10 with the inclusion of a pulse picker 56 at the input between the pulsed seed laser (not shown) and the polarising cube 42. It is known that in order to obtain high pulse energies in ultrashort pulses, it is frequently necessary to reduce the pulse repetition rate. This can be achieved by placing a pulse picker 56 between the seed laser and the amplifier 10. The amplifier 10 then acts only on the wanted pulses. The blocked pulses do not necessarily constitute a strong energy loss since the average power of the seed laser will be small compared with the average output power of the amplifier 10, and the remaining average power is sufficient for saturating the amplifier 10. In this embodiment the only active component is the pulse picker all other components are purely passive.

In an example of the optical amplifier 10 with an integrated pre-amplifier 46 and power amplifier 48, an input seed power was varied from between 0 and 35 mW and the beam coupled into a thin slab power amplifier 14 pumped using four diode bars (not shown) each emitting 90 W. The geometry was arranged to provide a first path 16 of three traverses 32 in which the beam 12 made a double pass in the pre-amplifier stage 46 and a second path of seven traverses 32 in a single pass of the power amplifier stage 48. Previous single pass measurements with a cw fibre coupled laser had demonstrated a small signal gain coefficient of about 1.5 cm$^{-1}$ under similar conditions, whilst use of the crystal amplification medium 14 in an oscillator had generated 145 W.

Figure 7:
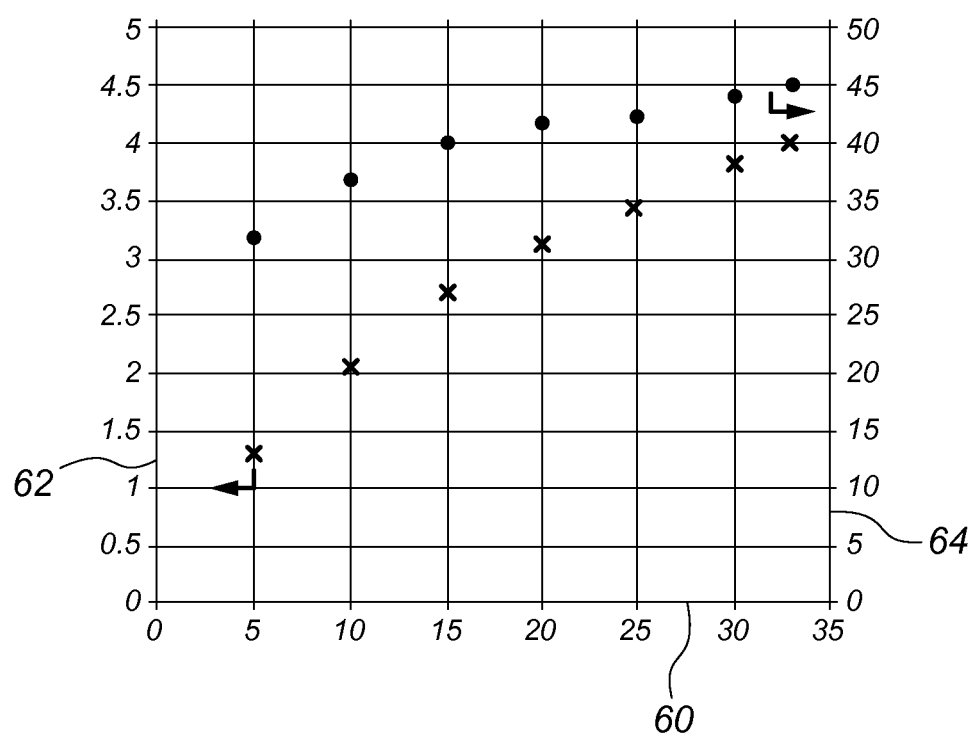
FIG. 7 is a plot of input seed power against output power from the pre-amplifier stage and the integrated pre-amplifier stage and power amplifier stage in an optical amplifier according to an embodiment of the present invention.

Referring to FIG. 7, there is illustrated a plot of input seed power 60, ranging from 0 to 35 mW, against pre-amplifier output power 62, ranging from 0 to 5 W, and power amplifier output power 64, ranging from 0 to 50 W. The output power from the pre-amplifier is before launching into the power amplifier. The power amplifier output power is from an amplifier with the seven traverses power amplifier. While all points show an increase in output power from the power amplifier over the pre-amplifier, there is significantly more reduction in the pre-amplifier output, ~65%, than the power amplifier, ~30%, when the input seed is reduced from 33 mW to 5 mW. This demonstrates the importance of the pre-amplifier in this design. The additional power added to the seed by the pre-amplifier is sufficient to effectively saturate the power amplifier introducing a degree of insensitivity to the seed power. For example, a 50% reduction in seed power results in only a 10% reduction in amplifier output.

In a further demonstration, a power output of 50 W was achieved with a cw seed power of 30 mW using a seven traverse power amplifier. This is around three times higher than an output of 17 W achieved with a seed power of 30 mW in a system having no pre-amplification. The output beam measured M$^2$<1.3 and was observed as being Gaussian-like. When the amplifier was operated with a nine traverse power amplifier, the power output was 70 W whilst the beam quality of a Gaussian-like output beam and M$^2$<1.3 was still maintained.

As can be seen from the above examples, the inclusion of the pre-amplification stage 46 within the amplification medium 14 means that a seed input significantly below the power required for effective saturation is amplified using the pre-amplifier stage 46. The output power from the pre-amplifier stage 46 is sufficiently high to ensure effective saturation of the power amplifier 48 for seed powers as low as 15 mW. The output power from the power amplifier 48 is then largely unaffected by increases in the seed power.

The ramification of this operational performance is particularly significant when optimising the pulse parameters for processes conducted using ultra-short pulses. In a traditional system where the seed is at a fixed frequency and a modest average power of up to 5 W, a pulse picker will be used to reject a number of adjacent pulses to reduce the frequency to the required value and therefore in traditional systems, the average output power would also be significantly reduced. If similar input criteria were applied to the amplifier illustrated in FIG. 6, typically, the output power from the amplifier 10 after the pulse picker may be reduced to an amount in the region of 0.1% to 10% of that emitted from the seed. Thus, the amplifier of the present invention can ensure amplification to a sufficiently high average power to enable industrial processes at the required speeds.

A principle advantage of the present invention is that it provides an optical amplifier to amplify low power, reduced frequency, ultra-short seed pulses which generate output powers at a level required for efficient mass manufacturing processes.

A further advantage of the present invention is that it provides an optical amplifier which integrates a pre-amplifier and a power amplifier in an active medium with partial coupling of the pre-amplifier and the power amplifier providing a compact device at relatively low cost.

A still further advantage of an embodiment of the present invention is that it provides an optical amplifier which uses purely passive components.

It will be appreciated by those skilled in the art that various modifications may be made to the invention herein described without departing from the scope thereof. For example, a stable or unstable beam can be created by selecting appropriate optics and/or by manipulating the beam within the amplification medium. Use of a thin amplification medium can, with sufficient heating, generate a thermal lens to manipulate the beam. An index waveguide structure could be used which allows reduced heating so that guiding is by total internal reflection and a thermal lens is avoided.

We claim:

1. Optical amplifier apparatus comprising:
   an amplification medium that has a rectangular cross-section with a long edge and a short edge,
   at least two highly reflective mirrors, wherein the amplification medium is arranged between the at least two highly reflective mirrors,
   wherein the short edge of the cross-section is along the x-axis, the long edge is along the y-axis, and the z-axis is the optical axis, and wherein the x-, y- and z-axes constitute a rectangular system of coordinates,
   wherein a beam, emitted from an oscillator, makes at least one reflection from each of the at least two highly reflective mirrors to define a path comprising a plurality of traverses through the amplification medium in the xz plane,
   the beam making a double pass of a first path in a pre-amplifier stage and a single pass of a second path in a power amplifier stage, and wherein the first and second paths are independent and overlap in the amplification medium.

2. The optical amplifier apparatus as claimed in claim 1 wherein there are at least three traverses of the amplification medium on the first path and the second path.

3. The optical amplifier apparatus as claimed in claim 1 wherein the second path makes at least one more traverse than the first path.

4. The optical amplifier apparatus as claimed in claim 1 wherein the optical amplifier includes an imaging mirror located at an exit side of the amplification medium wherein the beam is incident upon the imaging mirror after a first pass of the first path and the imaging mirror is arranged to re-image the beam back along the first path to make the double pass in the pre-amplifier stage.

5. The optical amplifier apparatus as claimed in claim 1 wherein the optical amplifier includes first and second lenses located at an input side of the amplification medium wherein the lenses are arranged to form a telescope with a magnification of one and wherein the beam, on exiting the pre-amplifier stage, is re-imaged through the telescope to form an input beam to the power amplification stage.

6. The optical amplifier apparatus as claimed in claim 1 wherein the optical amplifier includes a plurality of polarising elements.

7. The optical amplifier apparatus as claimed in claim 4, wherein a first polarising element is located adjacent the imaging mirror on the exit side of the amplification medium.

8. The optical amplifier apparatus as claimed in claim 7 wherein the first polarising element is a quarter wave plate.

9. The optical amplifier apparatus as claimed claim 7 wherein a second polarising element is located at an input side of the amplification medium.

10. The optical amplifier apparatus as claimed in claim 9 wherein the second polarising element is a polarising cube.

11. The optical amplifier apparatus as claimed in claim 9 wherein the second polarising element and the first lens are arranged to couple the input beam emitted by the oscillator into the amplification medium for the pre-amplifier stage.

12. The optical amplifier apparatus as claimed in claim 10 wherein the polarisation cube is arranged between the first and second lenses.

13. The optical amplifier apparatus as claimed in claim 12 wherein a return mirror is located between the second polarising element and the second lens to redirect the beam back into the amplification medium for the power amplification stage.

14. The optical amplifier apparatus as claimed in claim 1 wherein the optical amplifier includes a pulse picker arranged at an input to the optical amplifier.

15. The optical amplifier apparatus as claimed in claim 1 wherein the highly reflective mirrors are planar.

16. The optical amplifier apparatus as claimed in claim 1 wherein the highly reflective mirrors may be selected from a group comprising: spherical mirrors, cylindrical mirrors and mirrors of differing radii of curvature along two perpendicular axes.

17. The optical amplifier apparatus as claimed in claim 1 wherein the amplification medium is a slab of rectangular shape and cross-section.

18. The optical amplifier apparatus as claimed in claim 17 wherein the amplification medium is a single optically excited crystalline slab.

19. The optical amplifier apparatus as claimed in claim 18 wherein the slab is formed in a crystalline sandwich structure with doped active medium arranged between two un-doped active mediums.

20. The optical amplifier apparatus as claimed in as claimed in claim 1 wherein the amplification medium is a gas excited between rectangular electrodes to provide a slab discharge having a rectangular cross-section with a long edge and a short edge.

21. Optical amplifier apparatus comprising:
   an amplification medium that has a rectangular cross-section with a long edge and a short edge,
   at least two highly reflective mirrors, wherein the amplification medium is arranged between the at least two highly reflective mirrors,
   wherein the short edge of the cross-section is along the x-axis, the long edge is along the y-axis, and the z-axis is the optical axis, and wherein the x-, y- and z-axes constitute a rectangular system of coordinates,
   wherein a beam, emitted from an oscillator, makes at least one reflection from each of the at least two highly reflective mirrors to define a path comprising a plurality of traverses through the amplification medium in the xz plane, the beam making a double pass of a first path in a pre-amplifier stage and a single pass of a second path in a power amplifier stage,
   wherein the optical amplifier includes an imaging mirror located at an exit side of the amplification medium wherein the beam is incident upon the imaging mirror after a first pass of the first path and the imaging mirror is arranged to re-image the beam back along the first path to make the double pass in the pre-amplifier stage; and
   wherein the first and second paths are independent and overlap in the amplification medium.

* * * * *